Sept. 29, 1970  R. B. STIENS  3,530,715
FLUID METER COMPENSATOR

Filed Jan. 26, 1968  6 Sheets-Sheet 1

INVENTOR.
Robert B. Stiens
BY
Wood, Herron & Evans
ATTORNEYS

INVENTOR.
Robert B. Stiens
BY Wood, Herron & Evans
ATTORNEYS

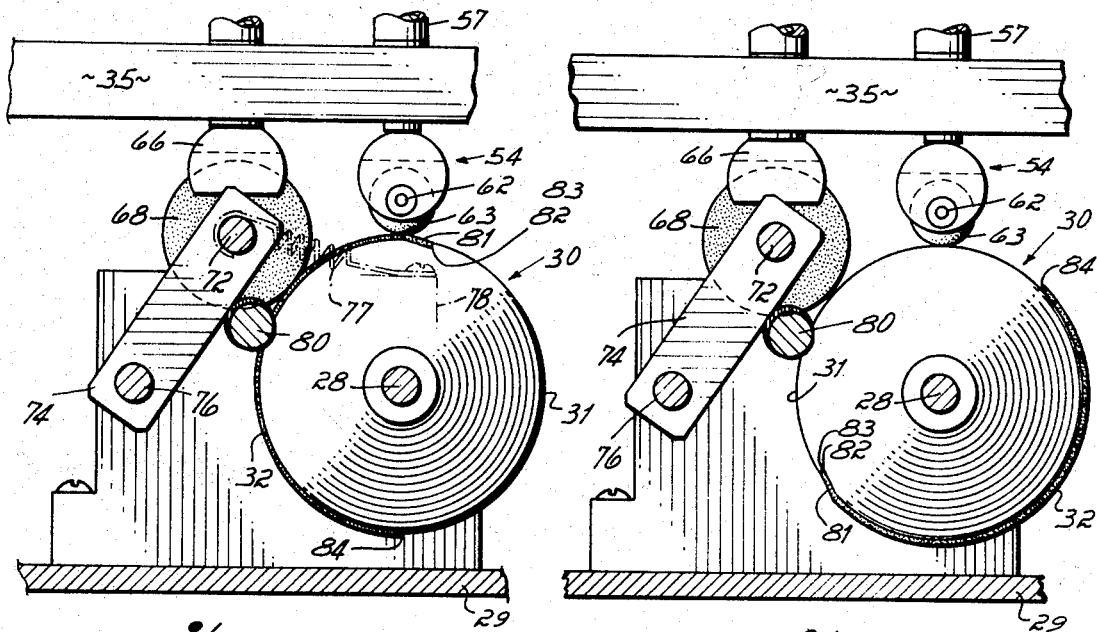

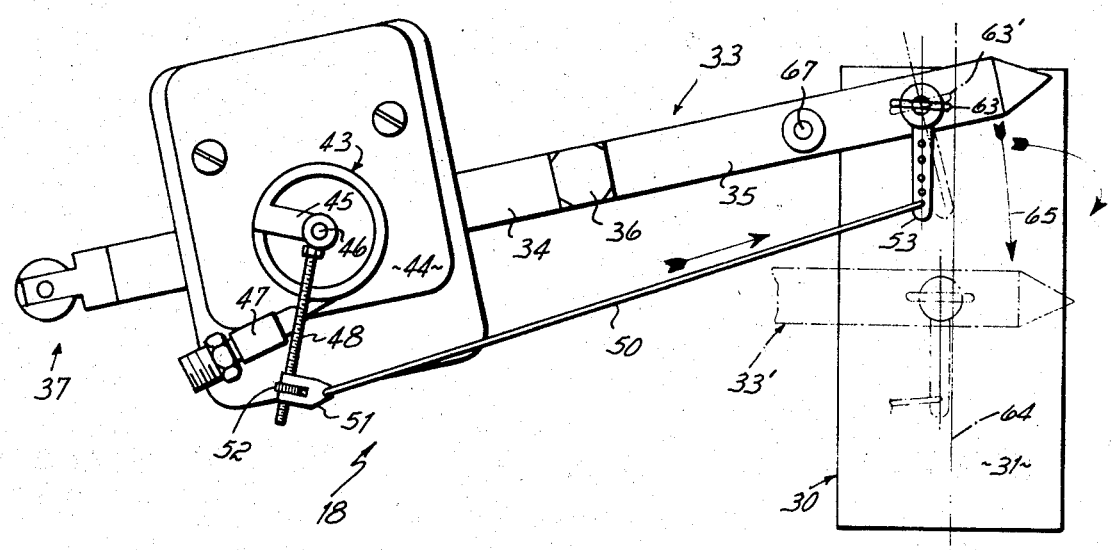

United States Patent Office 3,530,715
Patented Sept. 29, 1970

3,530,715
FLUID METER COMPENSATOR
Robert B. Stiens, Cincinnati, Ohio, assignor to Mercury Instruments, Inc., Cincinnati, Ohio, a corporation of Ohio
Filed Jan. 26, 1968, Ser. No. 700,851
Int. Cl. G01f 1/00, 3/02
U.S. Cl. 73—233
17 Claims

ABSTRACT OF THE DISCLOSURE

Apparatus for correcting the volume of gas measured by a fluid meter for both changes in temperature and changes in pressure.

The compensator includes pressure and volume compensating mechanisms. Each mechanism comprises a torque amplifier in the form of a pivoted beam carrying a steering wheel in engagement with the periphery of a rotating drum. The steering wheel is pivoted through a linkage actuated by a pressure transducer (Bourdon tube) in one case and a temperature transducer (Bourdon tube) in the other. The pressure compensating drum is driven by the meter mechanism and includes a raised cam surface tracked by a follower mounted upon the beam and geared to a register. The temperature compensator drum is driven in synchronism with the pressure register and includes a modified frustoconical periphery. The wheel tracking this periphery drives a second register which reads gas volume corrected for both pressure and temperature.

BACKGROUND OF THE INVENTION

The present invention relates to fluid measuring apparatus of the type which indicates the cumulative volume of fluid passing through a meter and is more particularly directed to a compensator for correcting the measured volume of the fluid for changes in temperature and pressure. One of the principal fields of utility of the present invention is in connection with measuring gas as it is supplied by utilities to large users, such as industrial plants and the like.

It is customary for utilities to supply gas to users at various nominal line pressures; for example, a nominal line pressure of 100 p.s.i. However, because of variations in loads and the like, this pressure will vary through a substantial range of, perhaps, plus or minus 5 p.s.i. Additionally, in many parts of the country, the temperature of the gas delivered to the customer may vary from season to season over an extensive range. In order to effect equitable billing, many contacts between utilities and their customers specify that the gas consumption shall be corrected to a standard, or base, temperature; for example 60° F., and a standard, or base, pressure; for example 14.73 p.s.i., and base barometric pressure; for example, 14.40 p.s.i.

In the past, the gas volume delivered has been measured by a positive displacement meter and corrections for temperature and pressure have usually involved extensive manual computation involving the use of complex charts, graphs and the like. While some mechanisms have been proposed for determining gas volumes corrected for temperature and pressure, these mechanisms have not been completely satisfactory for a number of reasons, such as lack of sufficient accuracy, undue complexity, low reliability or the like.

Accordingly, it is the principal object of the present invention to provide an apparatus for automatically indicating measured gas volume compensated for pressure and temperature changes so that a direct reading can be obtained of the total quantity of gas flow corrected to a selected base temperature and pressure condition.

It is a further object of the present invention to provide a compensator of this type which can be interconnected to almost any type of positive displacement gas meter now in common use and which derives all of the power for its normal operation directly from the gas meter without requiring any additional power source.

It is still a further object of the present invention to provide a compensating mechanism which is extremely accurate and which is highly reliable in operation even after extended periods of use.

It is a further object of the present invention to provide a meter compensating device which is relatively economical to produce and which can readily be installed in various installations involving different gas pressures, different temperature conditions and the like.

More particularly, the present invention is predicated upon the concept of providing a meter compensating mechanism including a condition responsive transducer, e.g. a Bourdon tube, a bimetallic strip or the like, and a torque amplifier responsive to deflection of the transducer. The torque amplifier includes a beam mounted at one end for universal motion and carrying at the other end a steering wheel disposed for engagement with the surface of a moving drum. The steering wheel is pivotally mounted upon the beam so that the axis of rotation of the steering wheel can be shifted relative to the axis of rotation of the drum. A linkage interconnects the steering wheel support with the output of the transducers, such as the Bourdon tube.

In operation, when the transducer senses a change in the condition, i.e. pressure or temperature being sensed, a deflection is produced. This deflection causes the axis of the steering wheel to rotate. As the axis of the steering wheel is rotated, it is shifted axially of the drum from its equilibrium position, in which its plane is normal to the axis of rotation of the drum, to a new position in which this relationship is again present. As the steering wheel is displaced, the free end of the beam is similarly shifted. All of the force required to shift the steering wheel and beam is supplied by the drum. Thus, a relatively small deflection of the sensor is transformed to a larger deflection of the beam without increasing the torque requirement of the sensor. In a preferred embodiment, the pressure correcting drum is driven by the metering element of a conventional positive displacement meter. Hence, rotation of the drum is correlated with the uncorrected measurement of gas flow.

The pressure correcting drum carries a raised cam surface. A takeoff wheel is mounted on a shaft extending parallel to the drum axis and is positioned so that it engages this raised cam surface, but not the other peripheral portions of the drum. The position of the takeoff wheel axially of the drum is controlled by the position of the beam. The cam is configurated so that at various longitudinal positions along the drum, the circumferential length of the cam available for driving the takeoff wheel varies, depending upon the correction factor to be introduced for a given pressure deviation from the base value. Thus, the takeoff wheel is rotated a greater or lesser amount relative to the amount of drum rotation in accordance with the factor to be introduced for pressure variation. The takeoff wheel is connected to a suitable register which provides a direct readout of gas volume corrected to a reference pressure.

The temperature compensating mechanism also includes a torque amplifier beam which in this case is effective to amplify the deflection of a temperature sensor, such as a bourdon tube. The temperature compensating drum is driven in synchronism with the takeoff wheel of the pressure compensating mechanism. The temperature drum is of a modified frustoconical configuration providing a varying circumferential length for driving the steering wheel in engagement therewith. The steering wheel is rotated different amounts per drum revolution, the particular amount being dependent upon the axial position to which the steering wheel has been displaced by the temperature responsive torque amplifier beam. The steering wheel of the temperature compensator is connected to another register which registers gas volume corrected for both pressure and temperature.

One of the advantages of the present compensator mechanism is that it is extremely accurate and is effective to provide measurements corrected to selected base conditions with an accuracy, for example, of less than plus or minus one-half percent. Moreover, the mechanism requires no independent power source and is relatively rugged and reliable so that it can be operated for protracted periods without close supervision and maintenance.

These and other objects and advantages of the present invention will be more readily apparent from the following detailed description of the drawings illustrating a preferred embodiment of the invention.

In the drawings:

FIG. 8 is a cross-sectional view take along line 8—8 of FIG. 4 showing the pickup wheel in engagement with a raised portion of the drum.

FIG. 9 is a cross-sectional view similar to FIG. 8 showing the pickup wheel spaced from an unraised portion of the drum periphery.

FIG. 10 is a cross-sectional view taken along line 10—10 of FIG. 5.

FIG. 11 is a cross-sectional view taken along line 11—11 of FIG. 5.

FIG. 12 is a cross-sectional view taken along line 12—12 of FIG. 7.

FIG. 13 is a cross-sectional view taken along line 13—13 of FIG. 4.

FIG. 14 is a top plan view of the pressure compensating mechanism.

FIG. 15 is a top plan view of the temperature compensating mechanism.

Figure 1:
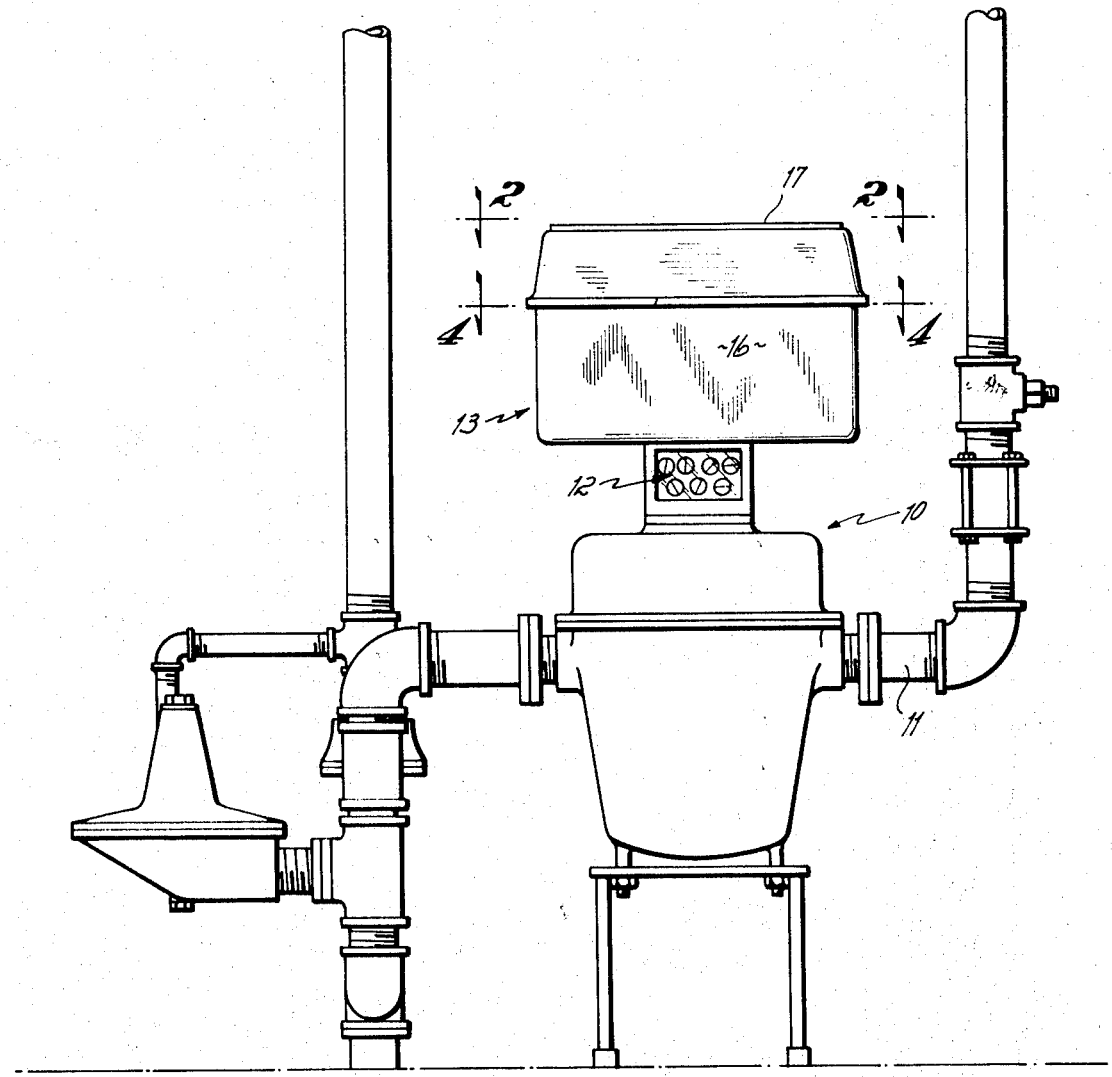
FIG. 1 is a front elevational view of a typical gas meter fitted with a preferred form of meter compensator embodying the present invention.

A typical installation of a meter provided with a meter compensator of the present invention is shown in FIG. 1. As there shown, a conventional positive displacement meter 10 measures the amount of a fluid, such as gas flowing through line 11. The uncorrected volume of this gas is shown on dials indicated generally at 12. A volume compensator 13 is mounted upon meter 10 and is connected to the meter mechanism as explained below. Volume compensator 13 inclues means for compensating the volume measurements of meter 10 for changes of pressure in the gas line and for changes in temperature.

Figure 2:
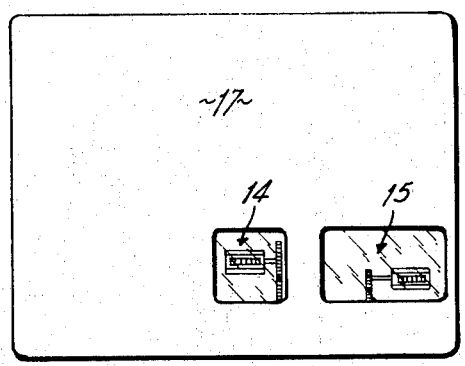
FIG. 2 is a top plan view of the compensator taken along line 2—2 of FIG. 1.

As is shown in FIG. 2, in the particular form of meter compensator shown, two output registers are provided. Register 14 provides a reading of volume compensated only for pressure changes. Register 15 provides a reading of volume compensated for both pressure and temperature changes. It will, of course, be obvious that if the user is interested only in volume measurements compensated for both pressure and temperature, register 14 can be eliminated and only register 15 utilized. Similarly, if the user is interested only in volume readings compensated for pressure, only register 14 is utilized and register 15 and the associated temperature compensating mechanism can be eliminated.

The overall construction of the present compensating unit 13 is best shown in FIGS. 1–4. More particularly, as is there shown, the meter compensator 13 comprises a housing 16 which is bolted or otherwise secured to the upper wall of meter assembly 10. The housing includes a top member 17 provided with transparent windows through which registers 14 and 15 are visible. Register 14 is operated by a pressure compensating mechanism indicated generally at 18; while register 15 is operated by a temperature compensating mechanism indicated at 19. These mechanisms are supported on a floating bottom plate 29 which is mounted upon the bottom wall of housing 16 by four spring mounts 39 (FIG. 13).

Plate 29 and the bottom wall of housing 16 are provided with openings for receiving an upwardly extending shaft 20. This shaft is connected to the positive displacement mechanism of meter 10 and is driven by the metering element of that unit. Consequently, shaft 20 is rotated an amount corresponding to the uncorrected volume of gas passing through meter 10. This shaft supplies all of the power for operating compensator 13.

More particularly, the upper end of shaft 20 carries a bevel gear 21 which drives a second bevel gear 22 mounted upon main drive shaft 23. This drive shaft, which is journalled in suitable journal brackets 24 and 25 secured to plate 29, carries a worm gear 26. Worm gear 26 in turn drives helical gear 27 mounted upon shaft 28. Shaft 28 carires pressure drum 30 which is secured to the shaft in any suitable manner for rotation therewith. Pressure drum 30 has a generally cylindrical peripheral portion 31 and carries a raised cam surface 32.

In addition to pressure drum 30, the pressure compensating assembly 18 comprises a Z-shaped beam member 33 including endwise offset parallel sections 34 and 35 and an interconnecting transverse section 36. The rear end of section 34 is secured to a universal mount 37. This universal mount includes a yoke mounted on the bottom plate 29. The yoke supports a block 38 joined to the yoke by transverse pivot pins 40. Block 38 in turn is pivotally secured to spaced flanges 41 of arm portion 34. These flanges are connected to the block for pivotal movement by means of pin 42.

Arm portion 34 carries a pressure transducer, such as a bourdon tube 43. This bourdon tube is supported from base 44, the base in turn being rigidly mounted upon arm portion 34 in any suitable manner. More particularly, the upper closed end 45 of the bourdon tube is pivotally carried by upstanding rod 46 secured to the base. The lower end 47 of the bourdon tube is provided with a flexible coupling for connecting the interior of the tube to the pressure within meter 10, which pressure is the same as that within gas line 11. As a result, when the pressure within line 11 changes, the upper end of the bourdon tube rotates around shaft 46. The upper end of this tube carries a radially extending threaded arm 48. This arm in turn is interconnected to one end of the rod 50.

Figure 3:
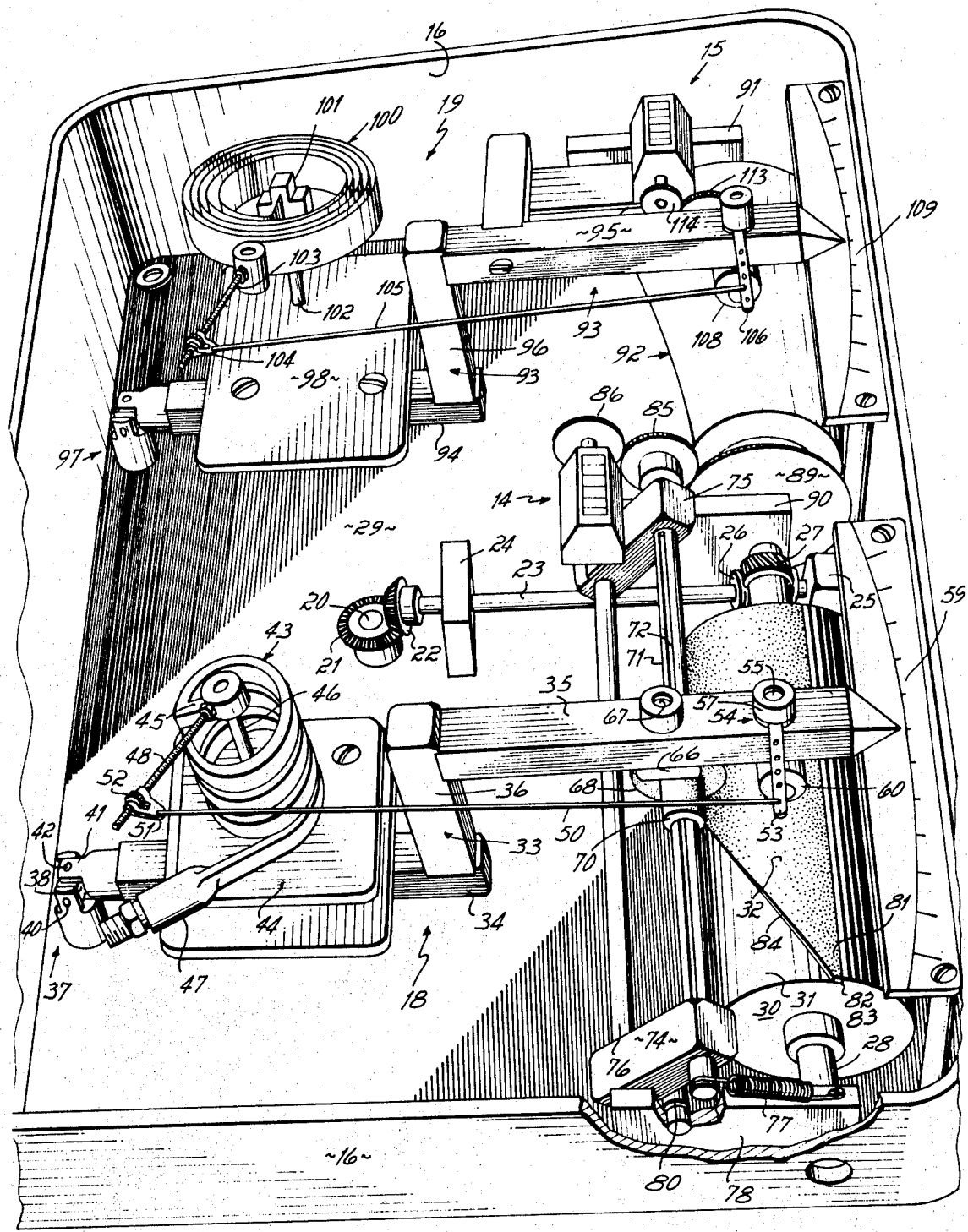
FIG. 3 is a perspective view of the volume compensator with the cover removed.
Figure 5:
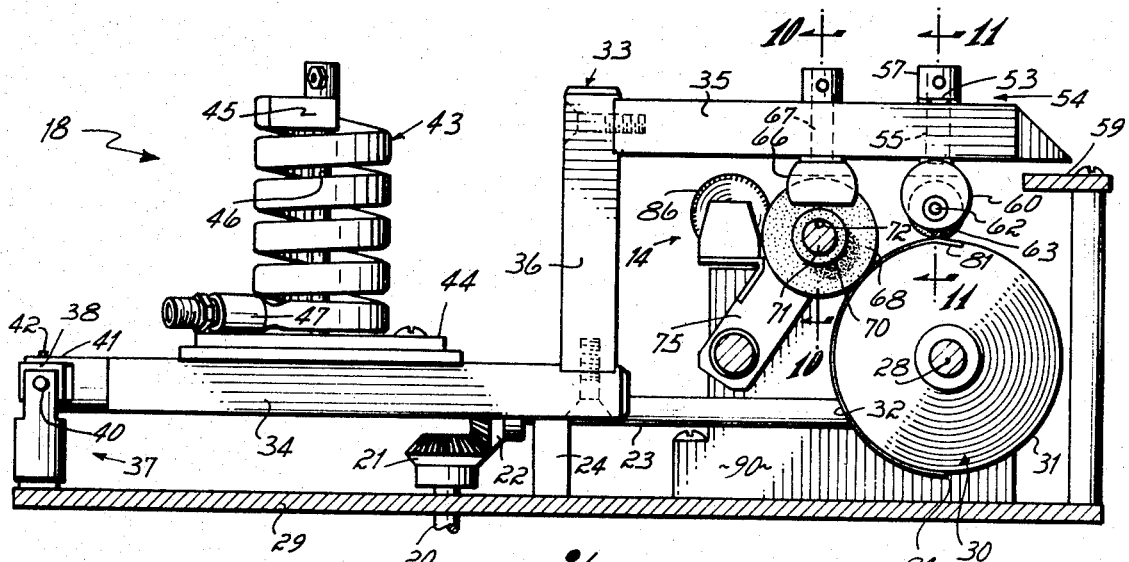
FIG. 5 is a cross-sectional view taken along line 5—5 of FIG. 4.
Figure 6:
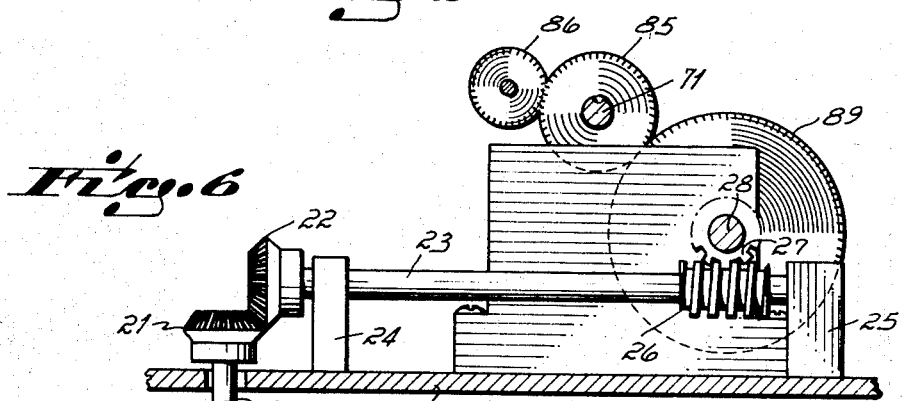
FIG. 6 is a cross-sectional view taken along line 6—6 of FIG. 4.
Figure 7:
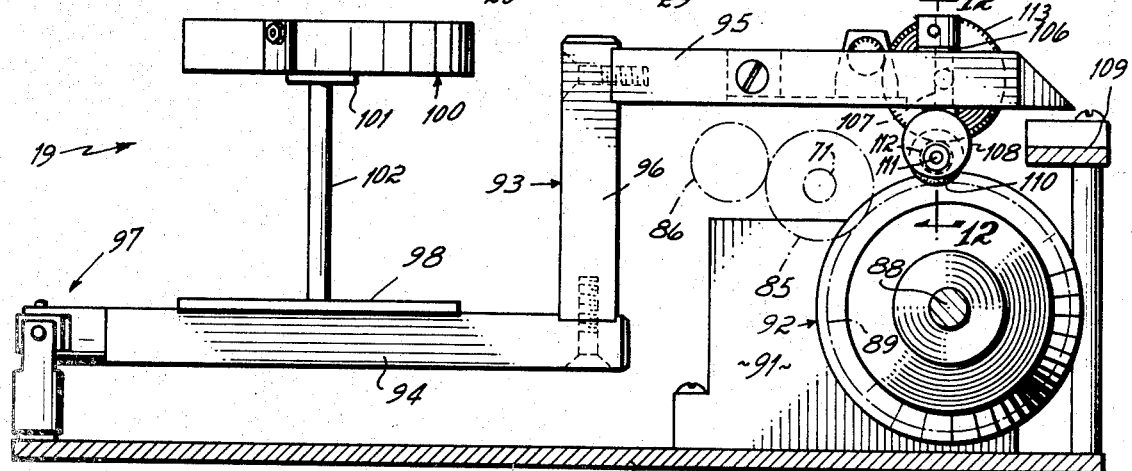
FIG. 7 is a cross-sectional view taken along line 7—7 of FIG. 4.

More particularly, the end of rod 50 carries a bifurcated coupling member 51, which fits over threaded arm 48. The coupling is selectively positioned along the length of arm 48 by means of a knurled threaded wheel 52 which is disposed between the arms of coupling 51 and threadably engages arm 48. The opposite end of rod 50 is pivotally connected to a radial arm 53 of steering wheel assembly 54. As is best shown in FIGS. 3 and 11, the steering wheel assembly 54 includes a pivotal shaft 55 extending downwardly through a bushing 56 mounted in a vertical bore of arm portion 35. The upper end of pivot pin 55 is secured to radial arm 53 for rotation with the arm, the arm and pin being held in assembled relationship by means of collar 57 and set screw 58. Pivot pin 55 carries at its lower end a yoke 60 which is held fast upon the pin as by means of set screws 61. The yoke includes two spaced arms which support a transverse shaft 62 upon which is mounted steering wheel 63. The steering wheel is formed of any suitable friction material, such as rubber or the like. As is shown in FIGS. 5, 8 and 9, steering wheel 63 rests upon the periphery 31 of drum 30 or upon cam 32. Consequently, the steering wheel is continuously rotated by the drum.

The components thus far described function as a torque amplifier. Specifically, a change in pressure of the metered gas is sensed by the bourdon tube and causes rotation of the upper end of the tube and radial arm 48. This rotation is transmitted through rod 50, arm 53 and shaft 55 to steering wheel 63. As a result, the steering wheel pivots about an axis from its equilibrium position shown in full lines in FIG. 14. In this equilibrium position, arm 33 is oriented with respect to pressure cylinder 30 so that wheel 63 is disposed in a plane normal to the axis of rotation 64 of the drum. Thus, the drum exerts no force upon the wheel tending to shift it axially along the drum.

However, when the pressure in the bourdon tube changes, for example so that the upper end of the tube is rotated in a counterclockwise fashion as shown in FIG. 14, rod 50 is translated to rotate the steering wheel to a position like that shown in 63'. When the steering wheel is rotated in this position, its plane is no longer normal to the axis of rotation of drum 30. As a result, the drum applies to the steering wheel an axial force component tending to shift that wheel axially of the drum in the direction of arrow 65 in FIG. 14. This force applied to the wheel causes arm 33 to pivot about pin 42. This motion continues until arm 33 reaches a new position 33' in which the plane of wheel 63 is again normal to the axis of rotation 64 of drum 30.

When the arm and wheel reach this position, a new equilibrium is established since no further sideways thrust is applied to wheel 63. As a result of this construction, a relatively small torque developed by bourdon tube 43 is converted to a relatively large corresponding movement of the free end of beam 33.

Beam section 33 carries at an intermediate portion a depending channel-shaped pusher block 66 which is pivotally mounted upon pin 67 extending downwardly through a bushing mounted in a bore formed in arm 35. The channel-shaped block 66 includes two arms disposed upon opposite sides of a follower, or takeoff, wheel 68. This wheel is formed with an integral hub 70 slidably mounted upon a shaft 71. Shaft 71 is provided with a slotted keyway 72 and follower wheel 68 carries a suitable key member 73 in engagement with the slot. As a result, wheel 68 is free to shift along shaft 71 but nevertheless is effective to rotate that shaft.

The ends of shaft 71 are rotatably journalled in bracket arms 74 and 75. These bracket arms are pivotally mounted upon a cross shaft 76 extending parallel to drum shaft 28. A tension spring 77 is interconnected between shaft 72 and stationary mounting block 78. This spring is effective to pivot bracket arm 74 in a clockwise direction as viewed in FIG. 8 and, hence, is effective to urge takeoff wheel 68 toward drum 30 and cam 32. However, movement of the wheel in that direction is limited by means of an adjustable eccentric abutment 80 mounted in block 78. As is shown in FIGS. 8 and 9, eccentric abutment 80 is rotated to a position in which follower wheel 68 is spaced from the generally cylindrical peripheral portion 31 of drum 30, but nevertheless engages and is rotated by raised cam surface 32.

As is best shown in FIGS. 3 and 9, the peripheral portion 31 of drum 30 is relieved slightly adjacent to the leading edge of cam 32 to form what is in effect a ramp portion 81. It will be readily appreciated that the spacing of wheel 68 from the generally cylindrical portion 31 of the drum determines the exact point on ramp 81 which is initially engaged by the periphery of follower wheel 68. Thus, rotation of eccentric cam member 80 provides a fine adjustment for the pressure compensator as is explained below.

Figure 4:
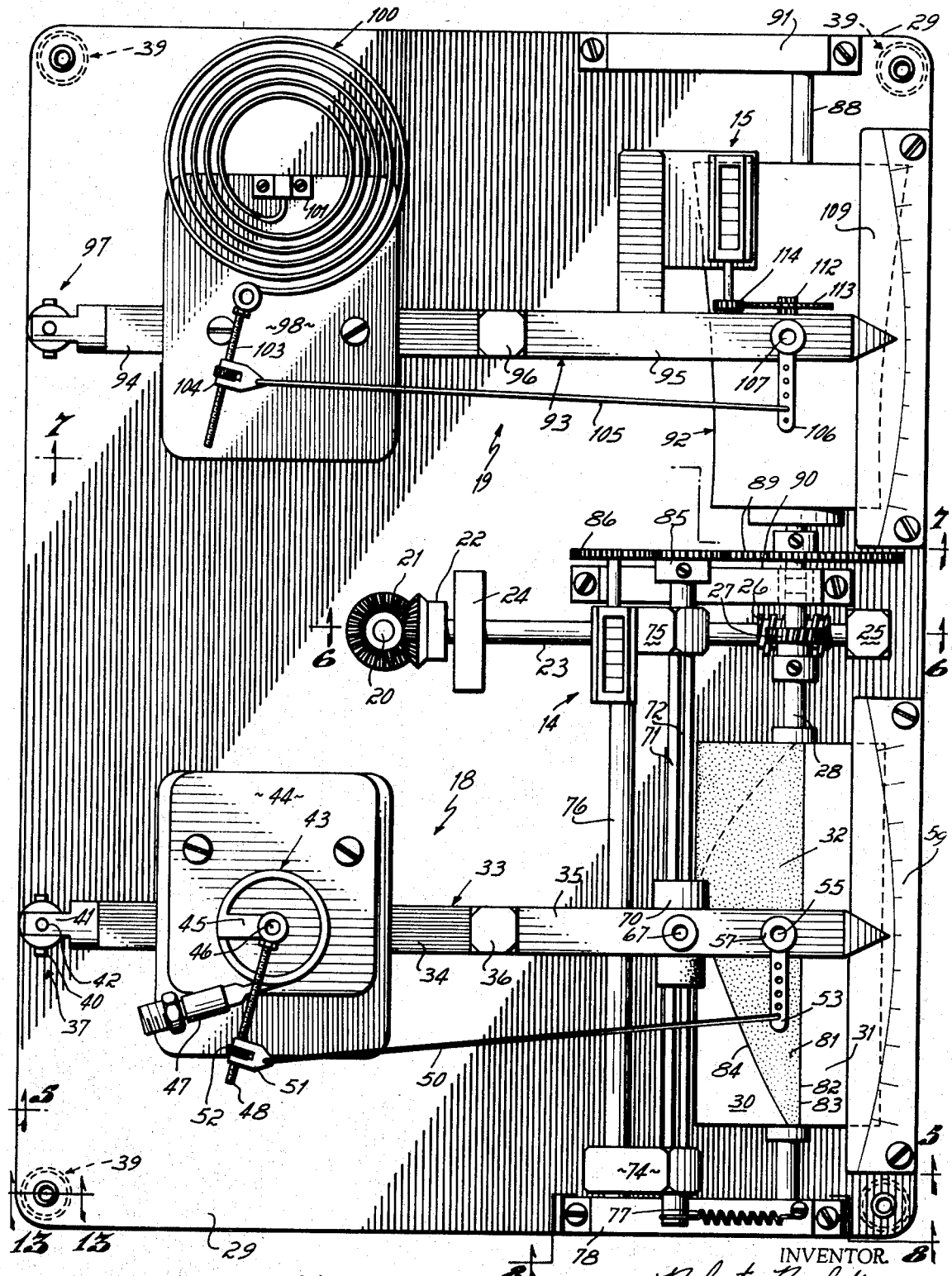
FIG. 4 is a cross-sectional view of the compensator taken along line 4—4 of FIG. 1.

As is best shown in FIGS. 3, 4 and 9, raised cam surface 32 is formed from a relatively thin sheet of any suitable friction material, such as cork, silicone rubber or the like. One edge 82 of the cam is accurately aligned with the axis of drum 30 by means of shoulder 83 of the relieved portion of the drum. The other edge 84 of the cam surface is cut in a line extending angularly with relation to the axis of the drum in accordance with a predetermined mathematical relationship as is explained below.

It will be appreciated that drum 30 is rotated through its interconnection of the shaft 20 at a speed corresponding to the uncorrected volumetric flow of gas as measured by meter 10. However, follower wheel 68 is not limited to movement in absolute synchronism with the rotation of drum 30. Rather, follower wheel 68 is rotated only while it is in engagement with raised cam surface 32. Thus, if cam surface 32 extends completely around the periphery of drum 30 in the area in which the cam surface is contacted by wheel 68, the wheel is rotated throughout the complete revolution of the drum. On the other hand, if the cam surface 32 extends only over half the circumference of drum 30, wheel 68 is rotated during only half the period of rotation of the drum, etc.

Wheel 68 in turn drives shaft 72. This shaft carries gear 85 at one end, which meshes with a gear 86 connected to counter, or register, 14. As a result of this construction, register 14 can be advanced at a faster or slower rate relative to the speed of drum 30 depending upon the relative portion of the periphery of the drum covered by cam surface 32 in engagement with follower wheel 68. This in turn depends upon the axial position of follower wheel 68 as controlled by the pressure sensed by the Bourdon tube 43.

The contour of edge 84 of the cam is determined mathematically to provide the desired volume correction for pressure changes. Specifically, it will be recalled that in accordance with the general gas laws the following relationship exists between gas volumes and pressures:

$$V_s = \frac{P_M}{P_S} \times V_m$$

where $P_M$ and $P_S$ are the absolute pressure of the gas and standard, or base, pressures respectively and $V_m$ and $V_s$ are the measured gas volume and the gas volume referenced to the standard pressure respectively. It will be understood that $P_M = P_m + P_B$ where $P_m$ is the pressure measured and $P_B$ is the base barometric pressure, e.g. 14.40 p.s.i. $P_S$ is the standard reference, or base, pressure, e.g. 14.73 p.s.i. By way of illustration, to determine the volume of gas $V_s$ corrected to a base pressure of 14.73 p.s.i. when the gas is actually measured at a line presure $P_m$ of, for example, 120 p.s.i., the measured or uncorrected volume $V_m$ would have to be multiplied by the correction factor $$\frac{P_M}{P_S} = \frac{P_m + P_B}{P_S} = \frac{120 + 14.40}{14.73} = \frac{134.4}{14.73} = 9.12$$

Again, assume that one revolution of drum 30 corresponds to the uncorrected measurement of 100 cubic feet. Cam edge 84 should be configured so that when arm 33 is positioned by Bourdon tube 43 as the tube is subjected to 0.33 p.s.i., register 14 is advanced one hundred cubic feet for each rotation of drum 30. Edge 84 is further configurated so that the counter is rotated a greater or lesser amount in accordance with the correction factor $P_M/P_S$. Thus, in the example discussed above, when wheel 68 is positioned by the Bourdon tube under 120 p.s.i., the came surface 32 should cover a portion of the periphery of the drum so that wheel 68 and register 14 apply the correct factor 9.12 to the uncorrected volume as measured by meter 10. As a result, register 14 at all times provides a direct reading of the volume of gas measured by meter 10 as corrected for changes in pressure in line 11.

The apparatus can be calibrated to accurately position the counter wheel in relation to the cam for a given pressure reading by adjusting the radial position of coupling 51 along threaded arm 48. As an aid to this calibration, the outer end of arm section 35 is preferably pointed and is disposed in registry with an arcuate scale 59.

It will further be appreciated that minor compensations in the correction factor can be made by adjusting eccentric abutment member 80 to shift the amount of ramp 81 which is directed by follower wheel 68. It will further be appreciated that cam 32 can be configured to compensate for other factors; for example, super-compressibility by appropriately shaping the contour of edge 84 to superimpose this factor on the normal pressure compensating factor. It is contemplated that in many installations, such as those not subject to wide temperature variations, pressure variations constitute the only factor significantly affecting the quantity of measured gas. In such installations, it is contemplated that only the pressure portion of the unit as thus far described would be employed. It is further contemplated that any other suitable form of electrical or mechanical readout can be provided, the readout being actuated like register 14 from the rotation of shaft 72.

In the event that it is desired to provide a further correction for temperature variations, the pressure compensating mechanism also provides an input to the temperature compensating device. In the embodiment shown, this input is taken from gear 85 mounted upon shaft 72. This gear drives a gear 89 mounted upon main shaft 88 of temperature compensating gear mechanism 19. Shaft 88 is rotatably journalled in journal brackets 90 and 91 which are in turn joined to floating bottom plate 29. Shaft 88 carries a temperature drum 92 of modified frustoconical configuration. The precise configuration of this drum is explained in detail below.

Drum 92 cooperates with a beam assembly 93 of a construction generally similar to that of beam assembly 33. More particularly, beam assembly 93 is of generally Z-shaped configuration including offset parallel sections 94 and 95 interconnected by a transverse section 96. The rear end of section 94 is mounted for universal pivotal movement in a mount 97 identical in construction to mount 37 described above.

The lower rearward section 94 carries a plate 98 upon which is mounted a temperature transducer, such as a coiled Bourdon tube 100 filled with mercury. It will be understood that this tube includes a bulb portion (not shown) disposed within the gas line. The inner end of this coil 100 is mounted upon a block 101 carried by a post 102. The post and block are rigidly mounted relative to plate 98. The outermost convolution of the tube carries an outwardly extending threaded rod 103. This rod, which is disposed in a generally radial position relative to post 102, carries an adjustable coupling member 104 identical with coupling member 51 of the pressure correcting mechanism.

Coupling 104 is joined to the rear end of a rod member 105. The opposite end of this rod member is inserted in one of a series of openings in a radial arm 106 which is joined to a pivot pin 107 passing downwardly through beam section 95. The lower end of pivot pin 107 carries a yoke member 108 which in turn journals a steering wheel 110. This steering wheel is substantially identical to steering wheel 63. However, the shaft 111 which supports wheel 110 has an extension on one end thereof which carries a pinion 112. This pinion drives a gear 113 which in turn meshes with a gear 114 on the counter, or register, 15.

The operation of the beam portion of the temperature compensating mechanism is generally similar to the torque amplifying action of the beam in the pressure compensating mechanism. Specifically, as is shown in FIG. 15, the beam 93 normally assumes an equilibrium position in which steering wheel 110 is disposed in a plane normal to the axis 115 of temperature compensating drum 92. However, when the bulb of temperature coil, or tube, 100 is exposed to a temperature change, the outer or free end of the tube shifts its position, causing arm 103 to move through an arc. This in turn causes rod 105 to translate, pivoting arm 106, pin 107 and steering wheel 110. When the steering wheel is pivoted, for example to the dotted line 110' shown in FIG. 15, a force component parallel to the axis 115 of drum 92 is applied to the wheel. This causes the wheel to be shifted axially of the drum and causes corresponding pivotal movement of beam 93 to the dotted position 93' shown in FIG. 15 in which the wheel 110 is again disposed in a plane normal to axis 115 of the drum. As a result of this action, it is apparent that wheel 110 is at all times positioned axially of drum 92 in accordance with the temperature sensed by Bourbon tube 100. It is also apparent that drum 92 is rotated in synchronism with shaft 72 of the pressure compensating mechanism and, thus, its rotation corresponds to the volume measurements corrected for pressure.

In most gas measuring systems it is conventional to refer gas volume to the equivalent volume at a standard temperature, usually 60° F. In accordance with well-known gas laws, the relationship between the measured volume and temperature $V_m$ and $T_m$ and the standard volume and the temperature $V_s$ and $T_s$ is as follows:

$$V_s = \left(\frac{460 + T_s}{460 + T_m}\right) V_m$$

Thus, the temperature compensating mechanism must apply a correction factor equal to:

$$\left(\frac{460 + T_s}{460 + T_m}\right)$$

The conical shape of drum 92 determines this correction factor. For example, assume that the volume measured is to be referred to a base, or standard, temperature 60° F. When the steering wheel 110 is positioned in its 60° F. position, the correction factor is unity and counter 15 should be operating in exact synchronism with counter 14. Therefore, when wheel 110 is in the 60° F. position, the diameter of drum 92 is in engagement with the wheel, the wheel diameter, the gear ratio between gear 85 and gear 89 and the gear ratio between gears 112, 113 and 114, must be such that counter 15 reads the same as counter 14. The diameter of the drum is calculated so that for any temperature above or below 60° F., the counter wheel 15 reads a greater or lesser volume in accordance with the gas law set forth above. As in the pressure compensating stage, the end of beam section 95 is preferably pointed and registers with a scale 109 to facilitate initial calibration of the temperature compensator.

It will be apparent to those skilled in the art that since the rotational input to temperature drum 92 corresponds to the gas volume corrected for pressure, the temperature correction applied by the drum and wheel 110 to register 15 in effect constitutes a multiplier to the correction factor applied by the pressure compensating mechanism. Thus, the present mechanism is effective to apply both temperature and pressure corrections in accordance with the general gas law in which the temperature and pressure correction factors are multiplied. Again, it is contemplated that any suitable form of mechanical or electrical readout can be utilized in place of, or in addition to, register 15.

From the foregoing disclosure of the general principles of the present invention and the above description of a preferred embodiment, those skilled in the art will readily comprehend various modifications to which the present invention is susceptible. Therefore, I desire to be limited only by the scope of the following claims.

Having described my invention, I claim:

1. Apparatus for correcting the volume of fluid flow as measured by a fluid meter for variations in a condition affecting said measurement, said apparatus comprising a rotatable drum, means driving said drum in synchronism with said meter mechanism, said rotatable drum having an effective driving surface thereon, said driving surface being configurated to present different peripheral portions at different axial positions, a beam assembly, said beam assembly being pivotally mounted at a point remote from said drum, a rotatable steering wheel trackable upon said drum, means pivotally mounting said steering wheel upon said beam whereby the axis of rotation of said steering wheel can be varied relative to said beam, a transducer responsive to the condition being compensated for, said transducer being mounted upon said beam assembly and including a member shiftable in accordance with the value of said condition, means interconnecting said member and said steering wheel, whereby the axis of rotation of said steering wheel is pivoted in response to shifitng of the member, the engagement of said steering wheel with said drum forcing said steering wheel along said drum to a position in which the plane of said wheel is normal to the axis of rotation of said drum, movement of said steering wheel in turn causing pivotal movement of said beam assembly, a register for indicating the volume of fluid flow corrected for said condition, and means for advancing said register, said last named means being trackable upon said effective driving surface and shiftable by said beam axially of said drum in accordance with the position of said beam assembly.

2. The apparatus of claim 1 in which said driving surface constitutes the periphery of said drum, said drum being of a modified frustoconical configuration.

3. The apparatus of claim 1 in which said effective driving surface constitutes a raised cam.

4. The apparatus of claim 1 in which said apparatus corrects volume measurements for temperature and said transducer is a bourdon tube.

5. The apparatus of claim 1 in which said apparatus corrects for pressure and said transducer is a bourdon tube.

6. Apparatus for correcting the volume of fluid flow as measured by a fluid meter for variations in a condition affecting said measurement, said apparatus comprising a rotatable drum, means driving said drum in synchronism with said meter mechanism, said rotatable drum having a raised cam surface thereon, said cam surface being configurated to cover different portions of the periphery of said drum at different axial positions, a beam assembly, said beam assembly being pivotally mounted at a point remote from said drum and carrying a steering wheel trackable upon said drum, a transducer responsive to the condition being compensated for, said transducer being mounted upon said beam assembly and including a member shiftable in accordance with the value of said condition, means interconnecting said member and said steering wheel, whereby the axis of rotation of said steering wheel is pivoted in response to shifting of the member, a follower wheel disposed for engagement with said raised cam surface but being spaced from the other portions of said drum, means supporting said follower wheel for rotation about an axis parallel to the axis of rotation of said drum, said means mounting said follower wheel for slidable movement parallel to said drum, and means carried by said beam assembly for positioning said wheel axially of said drum in accordance with the position of said beam assembly, a register for indicating the corrected volume of fluid flow, and means interconnecting said register and said follower wheel.

7. The apparatus of claim 6 in which said apparatus corrects for pressure and said transducer is a bourdon tube.

8. The apparatus of claim 7 in which the leading edge of said cam surface is an angulated ramp surface, said apparatus further comprising adjustable abutment means for adjusting the spacing of said follower wheel from said drum to control the portion of said ramp surface initially engaged by said follower wheel.

9. The apparatus of claim 7 in which said means interconnecting said member and said steering wheel comprise a generally radially extending threaded arm interconnected to said member, a second radial arm interconnected to said steering wheel, and a rod, a coupling interconnecting one end of said rod to said threaded arm, a threaded nut for adjustably positioning said coupling, the other end of said rod being interconnected to said second radial arm.

10. The apparatus of claim 7 further comprising a scale in registry with the end of said beam for facilitating calibration of said apparatus.

11. Apparatus for correcting the volume of fluid flow as measured by a fluid meter for variations in a condition affecting said measurement, said apparatus comprising a rotatable drum, means driving said drum in synchronism with said meter mechanism, said rotatable drum having a frustoconical peripheral surface, a beam assembly, said beam assembly being pivotally mounted at a point remote from said drum, a rotatable steering wheel trackable upon said drum, means pivotally mounting said steering wheel upon said beam assembly whereby the axis of rotation of said steering wheel can be varied relative to said beam assembly, a transducer responsive to the condition being compensated for, said transducer being mounted upon said beam assembly and including a member shiftable in accordance with the value of said condition, means interconnecting said member and said steering wheel, whereby the axis of rotation of said steering wheel is pivoted in response to shifting of the member, the engagement of said steering wheel with said drum forcing said steering wheel along said drum to a position in which the plane of said wheel is normal to the axis of rotation of said drum, movement of said steering wheel in turn causing pivotal movement of said beam assembly, a register for indicating the corrected volume of fluid flow, and means interconnected to said steering wheel for advancing said register.

12. The apparatus of claim 11 in which said apparatus corrects for temperature and said transducer is a Bourdon tube.

13. The apparatus of claim 12 in which said means interconnecting said member and said steering wheel comprise a generally radially extending threaded arm interconnected to said member, a second radial arm interconnected to said steering wheel, and a rod, a coupling interconnecting one end of said rod to said threaded arm, a threaded nut for adjustably positioning said coupling, the other end of said rod being interconnected to said second radial arm.

14. The apparatus of claim 12 further comprising a scale in registry with the end of said beam for facilitating calibration of said apparatus.

15. Apparatus for correcting the volume of gas flow as measured by a fluid meter for variations in pressure and temperature, said apparatus comprising a first rotatable drum, means driving said drum in synchronism with said meter mechanism, said rotatable drum having a raised cam surface thereon, said cam surface being configurated to cover different portions of the periphery of said drum at different axial positions, a beam assembly, said beam assembly being pivotally mounted at a point remote from said drum and carrying a steering wheel trackable upon said drum, a pressure transducer responsive to the pressure of the gas, said tansducer being mounted upon said beam assembly and including a member shiftable in accordance with pressure of the gas, means interconnecting said member and said steering wheel, whereby the axis of rotation of said steering wheel is pivoted in response to shifting of the member, a follower wheel disposed for engagement with said raised cam surface but being spaced from the other portions of said drum, means supporting said follower wheel for rotation about an axis parallel to the axis of rotation of said drum, said means mounting said follower wheel for slidable movement parallel to said drum, and means carried by said beam assembly for positioning said wheel axially of said drum in accordance with the position of said beam assembly, a second rotatable drum, means driving said second drum in synchronism with said follower wheel, said second rotatable drum having a frustoconical peripheral surface, a beam assembly, said beam assembly being pivotally mounted at a point remote from said drum and carrying a steering wheel trackable upon said drum, a temperature transducer, said temperature transducer being mounted upon said beam assembly and including a member shiftable in accordance with the temperature, means interconnecting said member and said steering wheel, whereby the axis of rotation of said steering wheel is pivoted in response to shifting of the member, a register for indicating the volume of fluid flow corrected for temperature and pressure, and means interconnected to said steering wheel for advancing said register.

16. The apparatus of claim 15 in which said pressure transducer is a Bourbon tube and said temperature transducer is a Bourbon tube.

17. The apparatus of claim 15 further comprising a register for indicating the volume of fluid flow corrected only for pressure, and means interconnecting said register and said follower wheel.

References Cited

UNITED STATES PATENTS

| | | | |
|---|---|---|---|
| 1,927,432 | 9/1933 | Young | 73—233 XR |
| 2,293,478 | 8/1942 | Stevenson | 73—203 |
| 2,348,593 | 5/1944 | Beitler | 73—233 |
| 3,073,157 | 1/1963 | Gehre | 73—194 |
| 3,176,514 | 4/1965 | Foster | 73—229 |

RICHARD QUEISSER, Primary Examiner

JOHN K. LUNSFORD, Assistant Examiner

U.S. Cl. X.R.

73—205